United States Patent [19]
Gafken et al.

[11] Patent Number: 6,131,127
[45] Date of Patent: Oct. 10, 2000

[54] I/O TRANSACTIONS ON A LOW PIN COUNT BUS

[75] Inventors: Andrew H. Gafken, Folsom; Joseph A. Bennett, Rancho Cordova; David I. Poisner, Folsom, all of Calif.

[73] Assignee: Intel Corporation, Santa Clara, Calif.

[21] Appl. No.: 08/936,303

[22] Filed: Sep. 24, 1997

[51] Int. Cl.[7] .................................................. G06F 11/00
[52] U.S. Cl. ............................................................. 710/1
[58] Field of Search .................................... 710/110, 100, 710/101, 129, 1, 3, 5, 126; 713/322; 340/825.06

[56] References Cited

U.S. PATENT DOCUMENTS

| | | | |
|---|---|---|---|
| 3,633,166 | 1/1972 | Picard | 340/163 |
| 3,821,715 | 6/1974 | Hoff, Jr. et al. | 340/172.5 |
| 3,882,470 | 5/1975 | Hunter | 340/173 R |
| 3,924,241 | 12/1975 | Kronies | 340/172.5 |
| 3,972,028 | 7/1976 | Weber et al. | 340/172.5 |
| 4,007,452 | 2/1977 | Hoff, Jr. | 340/173 R |
| 4,099,231 | 7/1978 | Kotok et al. | 364/200 |
| 4,191,996 | 3/1980 | Chesley | 364/200 |
| 4,263,650 | 4/1981 | Bennett et al. | 364/200 |
| 4,286,321 | 8/1981 | Baker et al. | 364/200 |
| 4,306,298 | 12/1981 | McElroy | 364/900 |
| 4,315,308 | 2/1982 | Jackson | 364/200 |
| 4,333,142 | 6/1982 | Chesley | 364/200 |
| 4,373,183 | 2/1983 | Means et al. | 364/200 |
| 4,375,665 | 3/1983 | Schmidt | 364/200 |
| 4,443,864 | 4/1984 | McElroy | 364/900 |
| 4,449,207 | 5/1984 | Kung et al. | 365/230 |
| 4,470,114 | 9/1984 | Gerhold | 364/200 |
| 4,480,307 | 10/1984 | Budde et al. | 364/200 |
| 4,481,625 | 11/1984 | Roberts et al. | 370/85 |
| 4,488,218 | 12/1984 | Grimes | 364/200 |
| 4,513,370 | 4/1985 | Ziv et al. | 364/200 |
| 4,630,193 | 12/1986 | Kris | 364/200 |
| 4,660,141 | 4/1987 | Ceccon et al. | 364/200 |
| 4,675,813 | 6/1987 | Locke | 364/200 |
| 4,766,536 | 8/1988 | Wilson, Jr. et al. | 364/200 |
| 4,811,202 | 3/1989 | Schabowski | 364/200 |
| 4,920,486 | 4/1990 | Nielsen | 364/200 |
| 5,038,320 | 8/1991 | Heath et al. | 364/900 |
| 5,129,069 | 7/1992 | Helm et al. | 395/400 |
| 5,175,831 | 12/1992 | Kumar | 395/425 |
| 5,214,767 | 5/1993 | Wanner et al. | |
| 5,317,723 | 5/1994 | Heap et al. | 364/500 |
| 5,434,997 | 7/1995 | Landry et al. | 395/575 |
| 5,596,756 | 1/1997 | O'Brien | 395/750 |
| 5,634,099 | 5/1997 | Andrews et al. | |
| 5,841,715 | 11/1998 | Farmwald et al. | 365/203 |

*Primary Examiner*—Dennis M. Butler
*Assistant Examiner*—Omar A. Omar
*Attorney, Agent, or Firm*—Blakely, Sokoloff, Taylor & Zafman LLP

[57] ABSTRACT

A system having a bus coupled to a host and a peripheral controller device each coupled to a bus. The bus includes a plurality of general purpose signal lines to carry time-multiplexed address, data, and control information. The peripheral controller device communicates with the host over the bus to control devices such as parallel port controllers, serial port controllers, super I/O controllers, floppy disk controllers, keyboard controllers and memory devices.

20 Claims, 6 Drawing Sheets

I/O TRANSACTIONS ON A LOW PIN COUNT BUS

CROSS-REFERENCE TO RELATED APPLICATIONS

This application is related to U.S. patent application Ser. No. 936,848 filed Sep. 24, 1997, entitled MEMORY TRANSACTIONS ON A LOW PIN COUNT BUS, U.S. patent application Ser. No. 936,318, filed Sep. 24, 1997, entitled DIRECT MEMORY ACCESS (DMA) TRANSACTIONS ON A LOW PIN COUNT BUS, and U.S. patent application Ser. No. 936,319, filed Sep. 24, 1997, entitled BUS MASTER TRANSACTIONS ON A LOW PIN COUNT BUS. Each of the above identified applications are assigned to the same assignee as the present application.

1. Field of the Invention

The present invention relates to computer systems. More particularly, the present invention relates to communicating between different types of devices on a low pin count bus in a computer system.

2. Background

Conventional legacy-based computer systems include a variety of peripheral and memory devices that communicate with the system's chip-set or processor via an Industry Standard Architecture (ISA) bus or an Expansion bus (X-bus). The system chip-set or processor must include a large amount of pins (e.g., approximately 50–70 pins) and associated circuitry to support the ISA bus or X-bus signals that are used to interface the chip-set or processor with legacy-based peripheral devices including input/output (I/O) or I/O controller devices such as parallel port controllers, serial port controllers, super I/O controllers, floppy disk controllers, keyboard controllers, and memory devices such as non-volatile memory devices that store, for example, basic input-output services (BIOS) information.

The large number of pins needed to support the ISA bus and X-bus standards generally increases overall system cost. For example, larger packages are required for a chip-set or processor. Larger pin-count packages generally cost more than smaller pin-count packages, and are generally more susceptible to manufacturing quality and reliability problems during package assembly and system integration processes. Furthermore, larger pin-count packages require a greater amount of surface area on a printed circuit board (PCB) on which a computer system may be implemented. Therefore, it would be desirable to replace the ISA bus or X-bus in a computer system with a bus that would support the same types of peripheral devices, but utilize a relatively smaller number of pins or signal lines.

The ISA bus and X-bus standards also limit the amount of memory or I/O address space to 24 bits or approximately 16 MBytes of memory or I/O address space. As some processors and chip-sets can support 32 bits or 64 bits of address space, aliasing has previously been required to translate the processor address space to the ISA address space. Aliasing can produce significant overhead such that the performance of the computer system may be negatively impacted. Therefore, it would be desirable to replace the ISA bus and X-bus standards with a bus that may support an address space that is compatible with the processor or chip-set address space, and that potentially is unlimited.

The ISA bus and X-bus standards have a further disadvantage of being asynchronous. This generally increases design complexity for components that need to generate and respond to ISA bus and X-bus signals. Therefore, it would be desirable to replace the ISA bus and X-bus standards with a bus that may support synchronous communication between components so as to generally reduce the complexity of the bus interface circuitry.

SUMMARY OF THE INVENTION

A system is described having a host and a peripheral controller device each coupled to a bus. The bus includes a plurality of general purpose signal lines to carry time-multiplexed address, data, and control information. The peripheral controller device communicates with the host over the bus.

Other features and advantages of the present invention will be apparent from the accompanying drawings and from the detailed description that follows.

BRIEF DESCRIPTION OF THE DRAWINGS

The features and advantages of the present invention are illustrated by way of example and not limitation in the figures of the accompanying drawings in which like references indicate similar elements and in which.

DETAILED DESCRIPTION

A computer system with a low pin count (LPC) bus is disclosed. The LPC bus may replace the ISA bus or X-bus in a computer system while providing a communication mechanism between a host, such as a processor or chip-set, and peripheral devices, such as I/O or I/O controller devices and memory devices. For one embodiment, the LPC bus may include general purpose signal lines that carry substantially all time-multiplexed address, data, and control information to implement memory, I/O, direct memory access (DMA), and bus master transactions between the host and the peripheral devices.

An intended advantage of the LPC bus is that it may require significantly fewer signal lines (e.g., approximately 6–8 signal lines) to perform all of the functions previously performed by the approximately 50–70 signals lines of the ISA bus and X-bus standards. Since the number of signals lines for the LPC bus may be greatly reduced over the ISA bus and X-bus standards, the number of pins required on a computer system's chip-set or processor to support the LPC bus may be significantly reduced. Similarly, an LPC interface included within each peripheral device may use an equally small number of pins to interface with the chip-set or processor via the LPC bus. This may result in lower packaging costs for the component manufacturer and lower system costs for the computer system manufacturer. Additionally, this may result in higher quality and more reliable packaging and system integration.

Another intended advantage of the LPC bus is that memory and/or I/O address space is not limited to a particular number of address lines in a communication bus; rather, the LPC bus may serially carry as many address signals as are required to address any address space. Thus, conventional aliasing of memory or I/O address space may be avoided.

Another intended advantage of the LPC bus is that the LPC interface logic and/or software that may be used to interface a chip-set or processor with a peripheral device may be software compatible with existing computer systems employing ISA bus or X-bus standards. That is, no special driver or configuration is required by operating system software or application programs to run on an LPC bus system vs. ISA bus or X-bus systems.

Still another intended advantage of the LPC bus is that it may be a synchronous bus enabling LPC interface circuitry within host and peripheral devices to generally require less complex circuitry than asynchronous bus interface designs.

Figure 1:
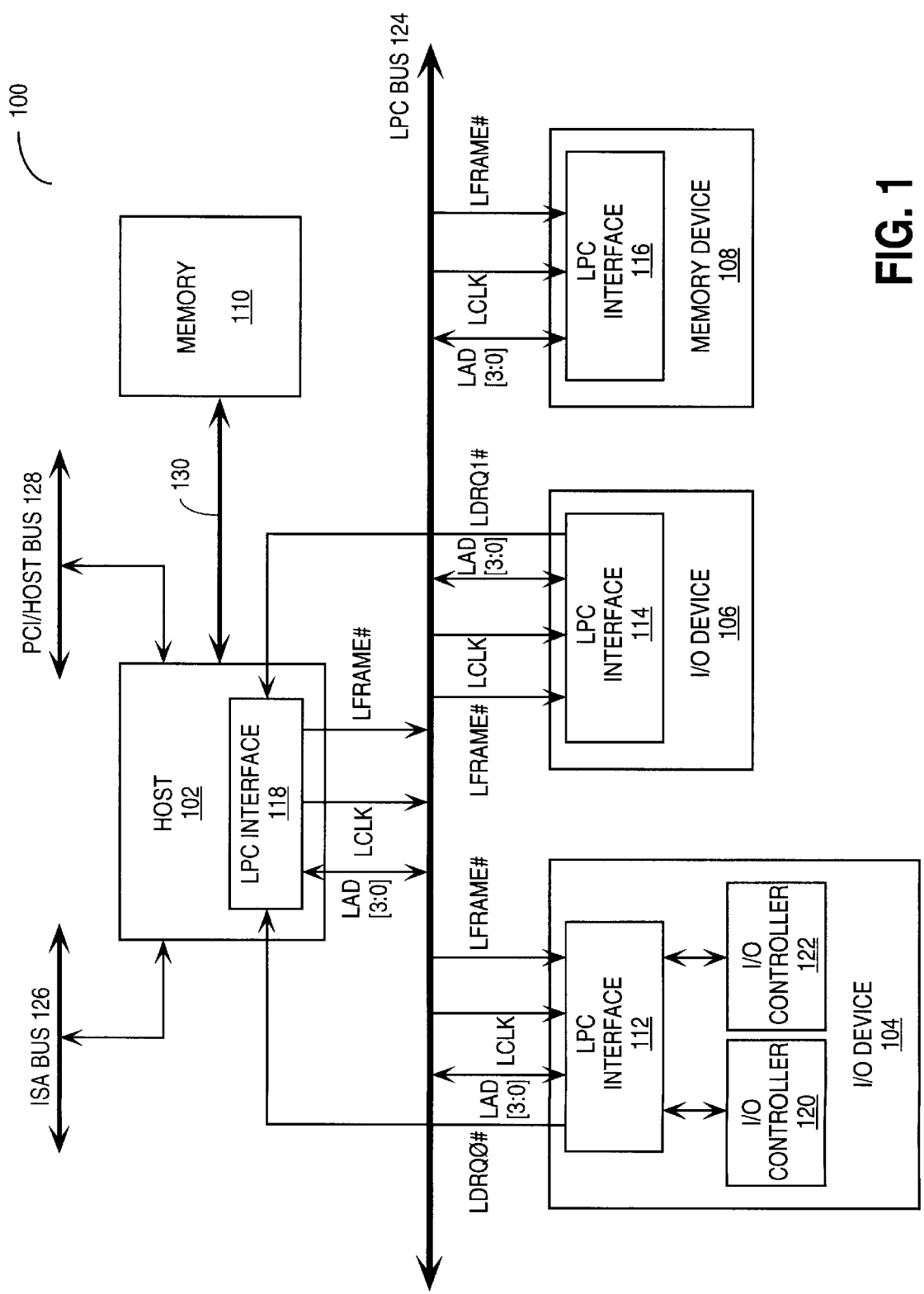
FIG. 1 is one embodiment of a computer system having a low pin count (LPC) bus.

FIG. 1 is one embodiment of computer system 100 including a host 102 coupled to peripheral devices including I/O or I/O controller devices 104 and 106, and memory device 108 via an LPC bus 124. Host 102 may be a chip-set, processor, or any other control logic that includes intelligence for interfacing with LPC bus 124. Host 102 may also include the necessary logic to interface with an optional ISA bus 126 and an optional PCI or Host bus 128. Host 102 communicates address, data, and control information with memory 110 over bus 130 that may be a local bus or other memory bus. Memory 130 may be the main or primary memory for system 100 such as dynamic random access memory (DRAM), static random access memory (SRAM), or any other type of volatile or non-volatile memory that may store, for example, operating system software, application code, or program data.

I/O devices 104 and 106, may be I/O controller devices that are addressable in I/O address space and control access to peripheral components such as floppy disk drives, keyboards, and the like. I/O devices 104 and 106 may each be, for example, a floppy disk controller, a serial port controller, a parallel port controller, an infra-red (IR) controller, a keyboard controller, audio controller device, or video controller device. I/O device 104 may a Super I/O device that includes I/O controllers 120 and 122 that may each be, for example, a floppy disk controller, a serial port controller, a parallel port controller, an infra-red (IR) controller, a keyboard controller, audio controller device, or video controller device.

Memory device 108 is a peripheral device that is addressable in memory space. For example, memory device 108 may include any type of volatile or nonvolatile memory such as DRAM, SRAM, flash memory, electrically programmable read only memory (EPROM), electrically erasable programmable read only memory (EEPROM), magnetic storage media, or optical storage media. Memory device 108 may store system start-up code, manageability code, operating system data, application code, program data, or function as a scratch pad for host 102 or I/O devices 104 and 106. System start-up code may include the necessary software to configure or boot components within system 100, and may include BIOS information.

Each of host 102 and the peripheral devices 104, 106, and 108 include LPC interfaces 118, 112, 114, and 116, respectively, for generating LPC signals and for responding to LPC signals on LPC bus 124. These LPC interfaces may enable system 100 to implement memory, I/O, DMA, and bus master transactions over LPC bus 124. Each LPC interface has either input or output pin(s) to receive or transmit signals LAD[3:0], LCLK, and LFRAME#. Note that a pound symbol "#" following a signal name indicates that the signal is an active low signal. For alternative embodiments, active low signals may be altered to be active high signals. The LAD[3:0] signal lines are general purpose signal lines that carry time-multiplexed address, data, and control information over LPC bus 124 and between host 102 and peripheral devices 104, 106, and 108. Whether LAD [3:0] is carrying address, data, or control information at any given time may be determined by the operating context of system 100 as will be described in greater detail below. While LAD[3:0] is illustrated as a four-bit bus, it may include any number of signal lines to carry out an intended purpose of carrying time-multiplexed address, data, and control information. A four-bit nibble-sized bus may be advantageous to reduce the number of pins required on each of the LPC interfaces 112–118 and reduce the number of pins and package sizes of host 102 and peripheral devices 104, 106, and 108.

LCLK is a clock signal that may be generated by LPC interface 118 or by other circuitry within host 102 (not shown). Alternatively, LCLK may be generated by a system clock (not shown) including a crystal or other timing circuitry. For one embodiment, LCLK may be the PCI clock from PCI bus 128.

LFRAME# is generated by LPC interface 118 of host 102 to indicate the start and/or end of LPC transactions or cycles. Each of LPC interfaces 112, 114, and 116, may monitor or sample LFRAME# to determine when an LPC transaction may begin or end. For example, when LFRAME# is asserted (e.g., low) by host 102, LPC interfaces 112, 114, and 116 of peripheral devices 104, 106, and 108, respectively, monitor LAD[3:0] to determine whether the transaction or cycle is for them. Advantageously, when a transaction is not intended for a particular peripheral device, that peripheral device may enter a lower power mode and may de-couple its state machines from the bus and/or gate its clocks. If LFRAME# is asserted for more than one LCLK cycle, then LPC interfaces 112, 114, and 116 may only react to the start control information on LAD[3:0] during the last LCLK cycle that LFRAME# is active. Table 1 summarizes exemplary definitions of the start control information on LAD [3:0] while LFRAME# is asserted.

TABLE 1

| LAD[3:0] | Function |
| --- | --- |
| 0000 | Start of transaction |
| 0001 | Reserved |
| 0010 | Grant for bus master 0 |
| 0011 | Grant for bus master 1 |
| 0100 | Reserved |
| 1101 | Memory read |
| 1110 | Memory write |
| 1111 | Stop/Abort transaction |

LFRAME# may also be used to abort or end LPC transactions. For example, LPC interfaces 112, 114, and 116 of peripheral devices, 104, 106, and 108, respectively, continue to monitor LFRAME# during LPC transactions. If LFRAME# is asserted during an LPC transaction, the peripheral devices 104, 106, and 108 will stop driving LAD[3:0] and abort their LPC transaction. For one embodiment, host 102 asserts LFRAME# for a number of LCLK cycles (e.g., four clock cycles) to ensure that the abort indication is recognized by all peripheral devices. During one or more of these LCLK cycles, host 102 may also drive predetermined data on LAD[3:0]. For one embodiment, host 102 drives 1111 on LAD[3:0] while LFRAME# is asserted to indicate an abort sequence. At the end of the abort sequence, LFRAME# may be deasserted before a new LPC transaction commences.

For alternative embodiments, LFRAME# may be used between any two devices (e.g., a host and peripheral device) in any system as an independent control signal on an independent control line (apart from a bus) to communicate the start or abortion of a transaction such as a memory, I/O, bus master, or DMA transaction.

LPC bus 124 may also include a reset signal LRESET# input into each of LPC interfaces 112, 114, 116, and 118 and that resets the LPC interfaces to a known state (e.g., an idle state). For one embodiment, LRESET# may be the same reset signal as a PCI reset signal on PCI bus 128.

I/O devices 104 and 106 may also have DMA request signals LDRQ0# and LDRQ1#, respectively, provided on separate control lines to LPC interface 118 of host 102. LDRQ0# and LDRQ1# may be used to transmit encoded DMA channel requests to host 102 prior to performing a DMA or bus master transaction. Each I/O device may have one unique LDRQ# signal such that peripheral device I/O controllers 120 and 122 share one DMA channel request on LDRQ0#.

Figure 6:
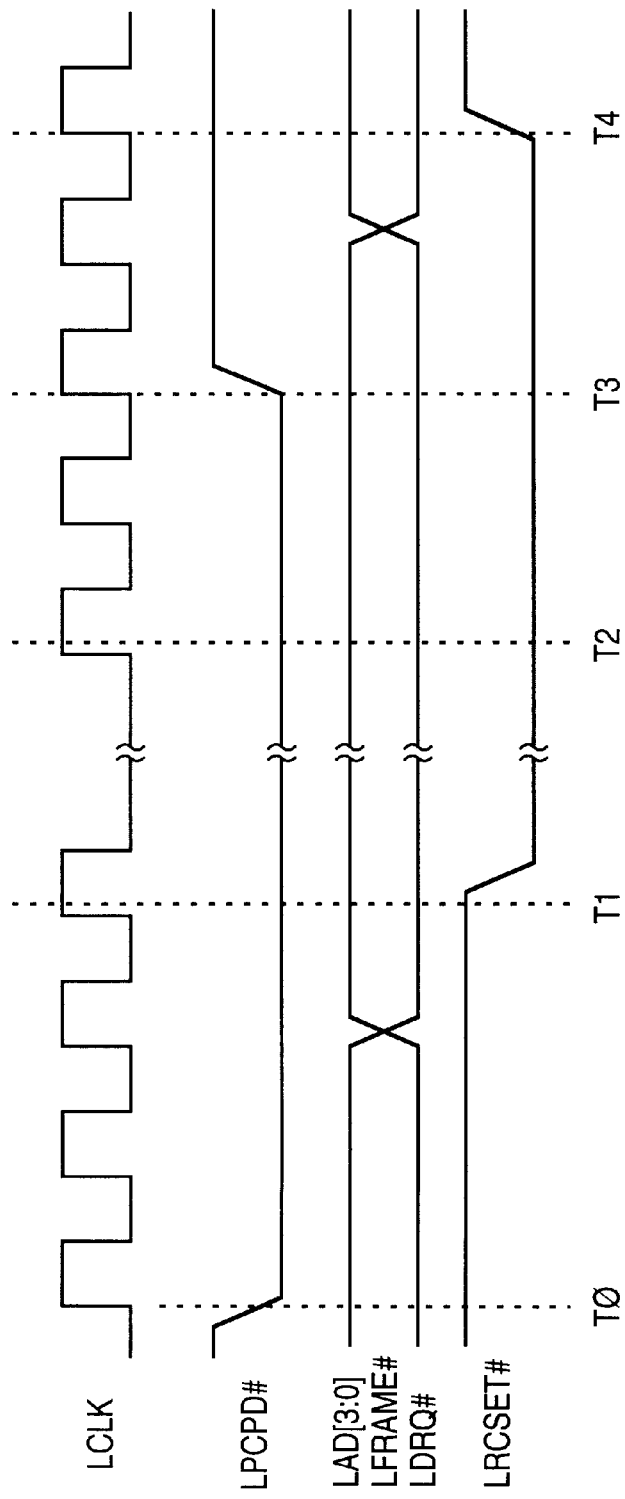
FIG. 6 is one embodiment of a timing diagram for a low power mode of operation.

LPC bus 124 may also include a low power or standby signal LPCPD# that may be output by host 102 to each of peripheral devices 104–108 on a separate control line. As illustrated in FIG. 6, host 102 may assert LPCPD# (e.g., low) asynchronously at time t0 to cause peripheral devices 104–108 to enter a low power mode. Upon recognizing LPCPD# asserted by host 102, peripheral devices 104–108 will halt any LPC transactions and tri-state or drive the LDRQ# signals inactive. Peripheral devices 104–108 and/or host 102 may also tri-state or drive LAD[3:0] to a known state. Host 102 may also drive LFRAME# to a known state (high or low) after asserting LPCPD#. In the low power mode, LCLK may be shut off at time t1 and peripheral devices 104–108 may shut off their states machines and/or other logic. For one embodiment, the time difference between t0 and t1 is at least 30 microseconds. When exiting the low power mode, LCLK may be restarted asynchronously at time t2 and may run for a period of time before LPCPD# may be deasserted at time t3. For one embodiment, the time difference between t2 and t3 is at least 100 microseconds. LRESET# may then be used to reset peripheral devices 104–108 from time t3 to t4. For one embodiment, the difference between times t3 and t4 is at least 60 microseconds.

Host 102 and peripheral devices 104–108 may also have additional sideband input and/or output signals utilized in ISA or PCI busses, including interrupt signals (e.g., SERIRQ and SMI#), additional clock signals (e.g., CLKRUN#), and power management signals as will be described in more detail below.

By utilizing approximately 6–9 signal lines, in one embodiment, LPC bus 124 may provide substantial signal and pin-count savings over conventional ISA bus or X-bus parts or systems. For example, the following ISA bus or X-bus signals typically found on plug-n-play devices may no longer be required: D[7:0], SA[15:0], DREQ[3:0], DACK#[3:0], TC, IOR#, IOW#, IOCHRDY, IOCS16#, and MEMCS16#. This may result in a savings of approximately 30–40 signals on the bus, the host, and/or peripheral devices. For one embodiment, a fully functional Super I/O peripheral controller device that may have required as large as a 160 pin package under ISA or X-bus compatible situations, may require an 88 pin (or less) package using an LPC interface as illustrated in FIG. 1.

The LPC bus may be used by the LPC interfaces 112–118 to perform memory, I/O, DMA, and bus master transactions or cycles including memory read, memory write, I/O read, I/O write, DMA read, DMA write, bus master memory read, bus master memory write, bus master I/O read, and bus master I/O write. The type of transaction may be indicated in a field of cycle type and direction control information driven on LAD[3:0] by host 102 or peripheral devices 104, 106, and 108. One embodiment of the cycle type and control information encoded on LAD[3:1] is shown in Table 2. Other encodings on the same or other signal lines may be used.

TABLE 2

| LAD[3:1] | Transaction |
|---|---|
| 000 | I/O Read |
| 001 | I/O Write |
| 010 | Memory Read |
| 011 | Memory Write |
| 100 | DMA Read |
| 101 | DMA Write |
| 110–111 | Reserved |

Figure 2:
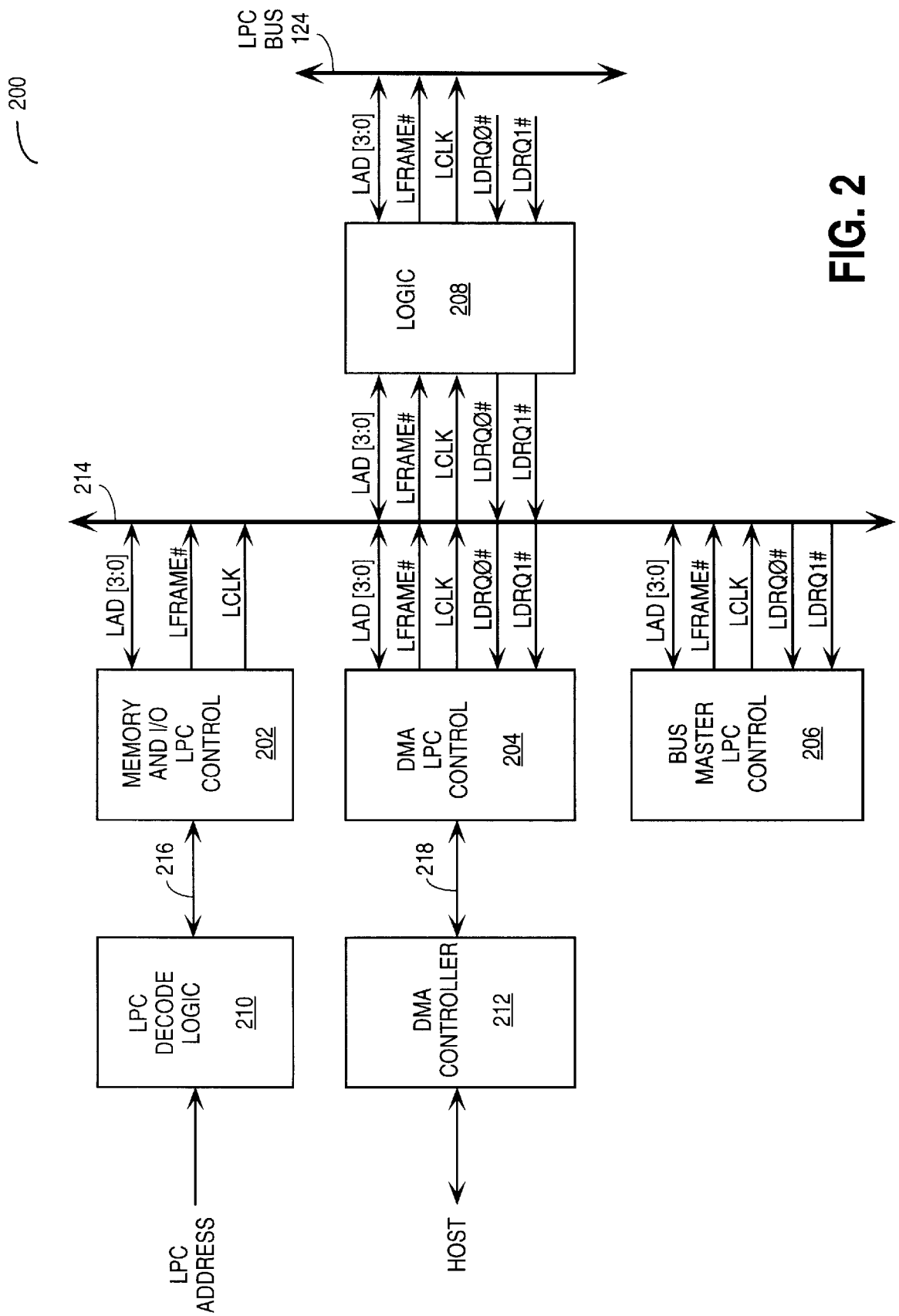
FIG. 2 is one embodiment of an LPC interface.

FIG. 2 shows LPC interface 200 that is one embodiment of LPC interface 118 of host 102. LPC interface 200 generates and interprets the address, data, and control information on LPC bus 124 to implement the transactions of Table 2. LPC interface 200 includes memory and I/O LPC control logic 202 that may control memory read, memory write, I/O read, and I/O write LPC transactions between host 102 and one of peripheral devices 104–108. Memory and I/O LPC control logic 202 may include a state machine or sequencer for sequencing between the states necessary for the particular LPC transaction, and for generating address, data, or control information on LAD[3:0], LFRAME#, and/or LCLK. The information provided on LAD[3:0], LFRAME#, and/or LCLK may be provided to bus 214 for output by logic 208 to LPC bus 124.

For one embodiment, memory and I/O LPC control logic 202 determines that an LPC memory or I/O transaction may be required to be performed by communicating with LPC decode logic 210 over one or more signals 216. LPC decode logic 210 may receive memory or I/O read or write request and an associated address from host 102, ISA bus 126, or PCI or host bus 128. LPC decode logic may decode the address and signal memory and I/O LPC control logic 202 to begin a memory or I/O LPC transaction. LPC decode logic 210 may alternatively be located outside of LPC interface 200 but within host 102. The decoded address ranges for peripheral device 104–108 may be defined so as to be compatible with previous ISA bus and X-bus legacy based peripheral devices to aid in making LPC transactions software transparent to operating system software and application software. For an alternative embodiment, control of the memory and I/O LPC transactions may be separated into different control circuits.

LPC interface 200 also includes DMA LPC control logic 204 that controls DMA read and write LPC transactions between host 102 and one of I/O devices 104 and 106. DMA LPC control logic 204 may include a state machine or sequencer for sequencing between the states necessary for the DMA LPC transaction, and for generating address, data, or control information on LAD[3:0], LFRAME#, and/or LCLK, and for receiving DMA request signals LDRQ0# and LDRQ1#. The information provided on LAD[3:0], LFRAME#, LDRQ0#, LDRQ1#, and/or LCLK may be provided to or from LPC bus 124 via logic 208 and bus 214. DMA LPC control logic 204 may interface with host 102 and memory 110 via DMA controller 212 that may reside in host 102. DMA LPC control logic 204 may communicate with DMA controller 212 over one or more signals 218. For one embodiment, DMA controller 212 may include one or more 8237 or 8237-compatible DMA controllers. DMA controller 212 may perform arbitration within host 102 on behalf of a DMA channel such that the I/O device using that DMA channel may communicate with main memory 110 via host 102.

DMA LPC control logic 204 may interface with host 102 and memory 110 via DMA controller 212 that may reside in host 102. DMA LPC control logic 204 may communicate with DMA controller 212 over one or more signals 218. For one embodiment, DMA controller 212 may include one or more 8237 or 8237-compatible DMA controllers. DMA controller 212 may perform arbitration within host 102 on behalf of a DMA channel such that the I/O device using that DMA channel may communicate with main memory 110 via host 102.

LPC interface 200 may also include bus master LPC control logic 206 that control bus master memory read and write LPC transactions, and bus master I/O read and write LPC transactions between host 102 and peripheral devices 104–108. Bus master LPC control logic 206 may include a state machine or sequencer for sequencing between the states necessary for the bus master LPC transactions, and for generating address, data, or control information on LAD[3:0], LFRAME#, and/or LCLK, and for receiving DMA request signals LDRQ0# and LDRQ1#. The information provided on LAD[3:0], LFRAME#, LDRQ0#, LDRQ1#, and/or LCLK may be provided to or from LPC bus 124 via logic 208 and bus 214.

Logic 208 may comprise one or more buffers or transceivers for interfacing LPC bus 124 with LPC bus 214. Alternatively, LPC interface 200 may not include bus 214; rather, logic 208 may be connected directly and individually to the input and output signals of memory and I/O LPC control logic 202, DMA LPC control logic 204, and bus master LPC control logic 206. For this alternative embodiment, logic 208 may be a selector or multiplexer circuit that outputs or inputs the appropriate LPC signals to and from LPC bus 124 and control logic 202, 204, and 206 under the control of host 102.

Figure 3:
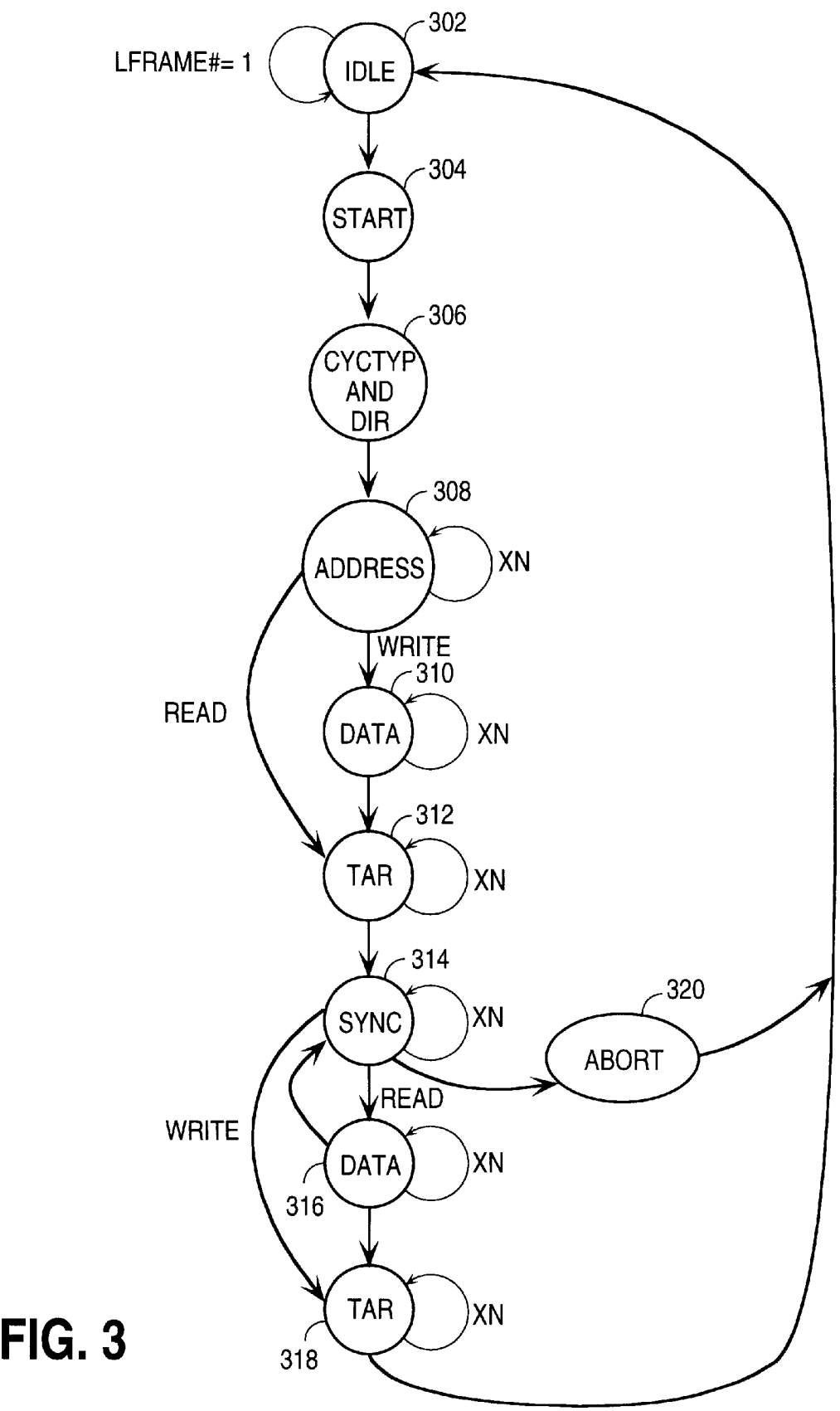
FIG. 3 is one embodiment of a state machine diagram for implementing memory and I/O transactions.

FIG. 3 is one embodiment of a state diagram that may be implemented one or more of LPC interfaces 112–118 to perform memory and/or I/O write or read LPC transactions between host 102 and peripherals 104–108. For example, the state diagram of FIG. 3 may be used by a state machine or sequencer of memory and I/O LPC control logic 202 of FIG. 2. This state diagram implements I/O read and I/O write LPC transactions. The I/O read and write LPC transactions will be described with the aid of exemplary timing diagrams of FIGS. 4 and 5.

Figure 4:
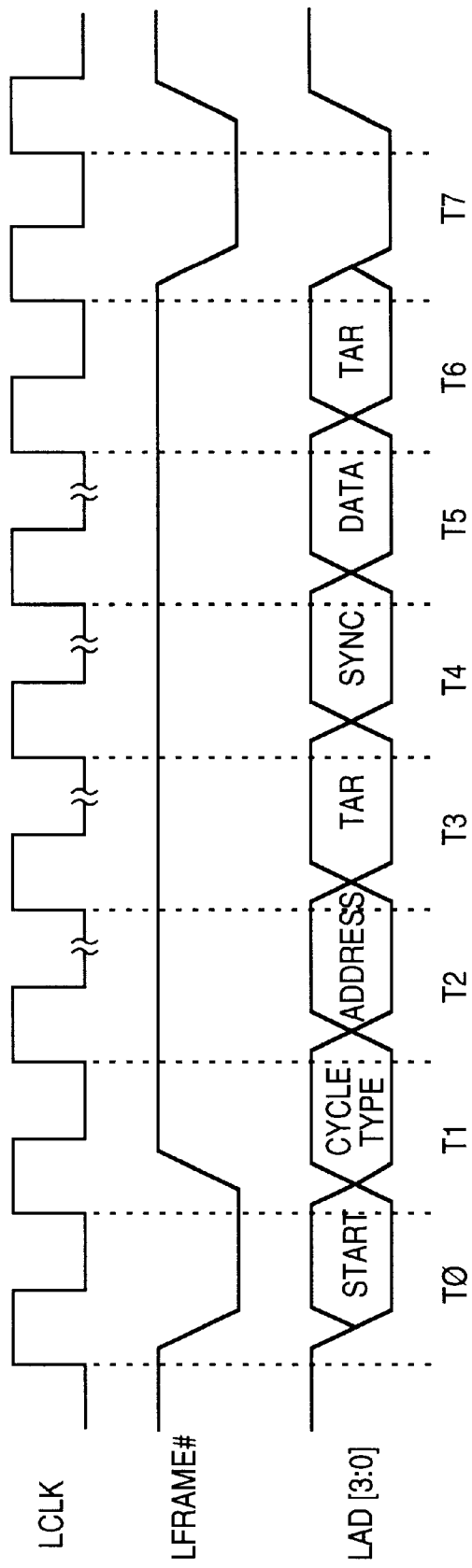
FIG. 4 is one embodiment of an LPC I/O read transaction.

An exemplary I/O or peripheral controller read LPC transaction by host 102 from a register, memory location, or a FIFO buffer that may exist in I/O device 106 will first be described with reference to FIGS. 3 and 4. This I/O read LPC transaction may be implemented, for example, by host 102 to read driver information, program data, application code, or other information from I/O device 106. At state 302, LPC interface 118 is in an idle state not performing an LPC transaction with LFRAME# deasserted (e.g., high). The process transitions to state 304 when host 102 commences an LPC transaction (e.g., when control logic 202 receives decoded signals from LPC decode logic 210 and host 102 indicating that a memory read LPC transaction is to occur) by asserting LFRAME# (e.g., low) on LPC bus 124. Host 102 may drive start control information indicating the start of an LPC transaction on LAD[3:0] during cycle T0. For example, the start control information may be 0000 on LAD[3:0] as indicated in Table 1.

The process then transitions to state 306 and host 102 drives cycle type and direction control information on LAD[3:0] during cycle T1. The cycle type and direction control information indicates to peripherals 104–108 that the LPC transaction is an I/O read transaction. For example, the cycle type and direction control information may be 000 on LAD[3:1] as indicated in Table 2.

The process then transitions to state 308 and host 102 drives the address of the I/O location in selected I/O device 106 on LAD[3:0] during n clock cycles T2. The address may be any length of bits supported by a system such as system 100 of FIG. 1, and sent over a number of n clock cycles T2. For one embodiment, the I/O address space may be 64 KBytes requiring 16 bits of I/O address. For this embodiment, four clock cycles of address information are provided by control logic to LPC bus 124 to transfer 4 nibbles (16 bits) of address information from host 102 to memory device 108. The address information may be provided most significant nibble first, least significant nibble first, or in any other order expected by I/O device 106.

For an alternative embodiment, host 102 may optionally drive size control information on LAD[3:0] during a subsequent cycle. For one embodiment, the size control information indicates the number of bytes of data to be read from I/O device 106 starting at the address provided in state 308. Table 3 provides one embodiment of encoding the number of bytes on LAD[1:0] to be subsequently transferred over LAD[3:0]. Other encodings on the same or different LAD signal lines may also be used.

TABLE 3

| LAD[1:0] | Size |
| --- | --- |
| 00 | 8 bits (1 byte) |
| 01 | 16 bits (2 bytes) |
| 10 | Reserved |
| 11 | 32 bits (4 bytes) |

For another embodiment, the size control information may indicate that $2^{size}$ number of bytes of memory data are to be read from memory device 108 starting at the address provided in state 306.

The process then transitions to turn around (TAR) state 312 to turn control of LPC bus 124 over from host 102 to I/O device 106 during n clock cycle(s) T4. For one embodiment, state 312 is two clocks wide. In the first clock cycle host 102 may drive LAD[3:0] lines with predetermined control information (e.g., 1111). In the second clock cycle, host 102 may tri-state LAD[3:0] lines. These lines may have weak pull-ups attached to these lines so that they may remain at logical high states. For other embodiments, n may be one clock cycle or greater than two clock cycles to turn around LAD[3:0].

The process may then transition to state 314 and in which host 102 waits n clock cycles T5 while I/O device 106 drives inband synchronization control information on LAD[3:0]. The synchronization control information may be used to add wait states until the I/O data is ready to be output by I/O device 106. In this manner, I/O devices of differing speeds or access times may be coupled to the same LPC bus. Conventionally, a dedicated control signal on a dedicated control line was used to indicate when data was ready (e.g., IOCHRDY in the ISA bus or X-bus). In contrast, I/O device 106 may use inband signaling on LAD[3:0] to insert wait states without requiring the use of an additional dedicated pin or signal line.

For one embodiment, the synchronization control information field has two phases. The first phase drives first control information on LAD[3:0] (e.g., 0101 or 0110) while accessing the requested data. The second phase drives second control information on LAD[3:0] indicating that the data is ready to be output to LPC bus 124 (e.g., 0000 on LAD [3:0]). Host 102 may monitor the synchronization control information and determine when the second information is sent. Host 102 may then know that the data output by I/O device 106 in the subsequent clock cycle(s) T6 will be the data requested by host 102. For one embodiment, the first control information has an encoding (e.g. 0110 on LAD[3:0]) that indicates that I/O device 106 may drive a relatively large number of wait states onto LAD[3:0] (e.g., approximately 20+ wait states). The first control information may also have an encoding (e.g., 0101 on LAD[3:0]) that indicates that I/O device 106 may drive a relatively small number of wait states onto LAD[3:0] (e.g., approximately 1–20 wait states). For one example (see Table 4 below), I/O device 106 may drive synchronization data of 0101 on LAD[3:0], respectively, for approximately 1–20 clock cycles and then drive one cycle of 0000 on LAD[3:0], respectively, to indicate that the requested data is ready and will be output on the following clock cycle.

If the number of wait states is large, host 120 may decide to abort the transaction by entering state 320. As previously described, host 102 may abort the transaction by asserting LFRAME# for one or more clock cycles and driving predetermined abort control information (e.g., 1111 as in Table 1) on LAD[3:0].

The synchronization field of control information may also be used by I/O device 106 to send an error message on LAD[3:0] to LPC interface 118 of host 102. The error message may be sent at any time during the synchronization sequence. For example, it may be sent as the second control information in the embodiment having first and second synchronization control information. The error message may indicate, for example, that the data requested is corrupted is some way, the peripheral device did not understand the request, an invalid request was made, or that a request has been issued while the peripheral device is in a power down mode or is in another mode in which it is not ready or able to output data. For one embodiment, if an error message is sent during an I/O read transaction, the data is read out and disregarded.

Table 4 provides one embodiment of encodings on LAD [3:0] for the synchronization control information described above. Other encodings may also be used.

TABLE 4

| LAD[3:0] | Indication |
| --- | --- |
| 0000 | Ready |
| 0001–0100 | Reserved |
| 0101 | Short Wait |
| 0110 | Long Wait |
| 0111–1000 | Reserved |
| 1001 | DMA Ready More |
| 1010 | Error |

TABLE 4-continued

| LAD[3:0] | Indication |
| --- | --- |
| 1011 | Reserved |
| 1100 | Ready No More Sync |
| 1101–1111 | Reserved |

For alternative embodiments, the inband synchronization control information may be used between any two devices (e.g., a host and peripheral device) over a general purpose time-multiplexed bus in any system to communicate wait state, error, or any other information previously described or summarized in Table 4.

When I/O device 106 is ready to output its data to LPC bus 124, after providing the appropriate synchronization control information on LAD[3:0] (e.g., 0000), the process transitions to state 316 for n clock cycle(s) T6. In state 316, host 102 reads data provided by I/O device 106 onto LAD[3:0]. I/O device 106 may drive data onto LAD[3:0] in byte increments over two clock cycles. For one embodiment of a two byte transfer, a first byte may be output in the first two clock cycles, and a second byte may be output in the following two clock cycles. For each byte, data may be output by I/O device 106 low nibble first, high nibble first, or in any other format. Similarly, each group of bytes output by I/O device 106 may be output low byte first, high byte first, or in any other format.

For one embodiment, multiple byte reads may be implemented by cycling between states 316 and 314 such that a field of synchronization control information is inserted between bytes. For an alternative embodiment, a burst read of multiple bytes may be read while the process is in state 316. In the alternative embodiment, I/O device 106 may drive 1100 on LAD[3:0] in state 314 to indicate that no more synchronization control information will be transferred between data bytes. For yet another embodiment, no particular synchronization control information may be needed to indicate a multiple or burst data read.

After all of the data has been read by host 102, the process transitions to turn around (TAR) state 318 in which control of LAD[3:0] may be returned to host 102 during n clock cycle(s) T7. As in state 312, state 318 may be two clocks wide. In the first clock cycle I/O device 106 may drive LAD[3:0] lines with predetermined control information (e.g., 1111). In the second clock cycle, I/O device 106 may tri-state LAD[3:0] lines. For other embodiments, n may be one clock cycle or greater than two clock cycles to turn around LAD[3:0].

Figure 5:
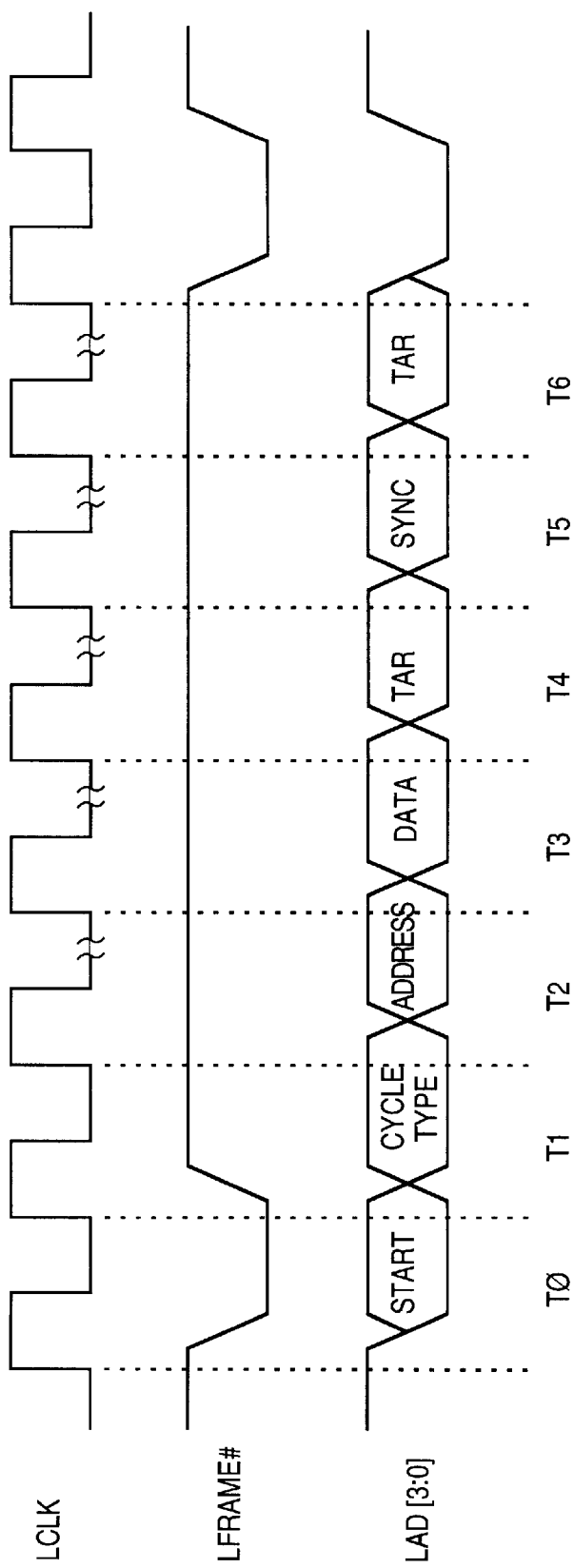
FIG. 5 is one embodiment of an LPC I/O write transaction.

An exemplary I/O write LPC transaction by host 102 to a location in memory device 108 will be described with reference to FIGS. 3 and 5. This I/O write LPC transaction may be implemented, for example, by host 102 to write driver information, program data, application code, or other information to a register, memory location, or a FIFO buffer that may exist in I/O device 106. At state 302, host 102 is in an idle state not performing an LPC transaction. The process commences an LPC transaction (e.g., when control logic 202 receives decoded signals from LPC decode logic 210 and host 102 indicating that a memory read LPC transaction is to occur) when host 102 asserts LFRAME# on LPC bus 124. The process then transitions to start state 304 and host 102 drives start control information on LAD[3:0] indicating the start of an LPC transaction. For example, the start control information may be 0000 as indicated in Table 1. The process then transitions to state 304 and drives cycle type and direction control information on LAD[3:0] during cycle T1 that indicates to peripherals 104–108 that the LPC transaction is a memory write transaction. For example, the cycle type and direction control information may be 001 on LAD[3:1] as indicated in Table 2.

The process then transitions to state 308 and host 102 drives the address of the location in selected I/O device 106 on LAD[3:0] during n clock cycle(s) T2. As previously indicated, the address may be any length of bits supported by a system such as system 100 of FIG. 1, and sent over of number of n clock cycles T2. The address information may be provided most significant nibble first, least significant nibble first, or in any other order expected by I/O device 106.

For an alternative embodiment, the process host 102 may then drive size control information on LAD[3:0] during cycle T3. The size control information may indicate the number of bytes of memory data to be written to I/O device 106 starting at the address provided in state 308.

The process then transitions to state 310 and host 102 writes the appropriate bytes of data in n clock cycle(s) T4 to I/O device 106 over LAD[3:0]. Host 102 may drive data onto LAD[3:0] in byte increments over two clock cycles. For example, if the transfer is a 16 bit or two byte transfer, then a first byte may be output in the first two clock cycles, and a second byte may be output in the following two clock cycles. For each byte, data may be output by host 102 low nibble first, high nibble first, or in any other format. Similarly, each group of bytes output by host 102 may be output low byte first, high byte first, or in any other format. Host 102 may write one or more (burst) bytes of data in state 310.

The process then transitions to turn around (TAR) state 312 to turn control of LPC bus 124 over to I/O device 106 during n clock cycle(s) T5. The process then transitions to state 314 and host 102 waits n clock cycles while I/O device 106 drives inband synchronization control information on LAD[3:0] during clock cycle(s) T6. For one embodiment, the synchronization control information may be one or more clock cycles and used to acknowledge the receipt of the data written into I/O device 106 (e.g., 0000 on LAD[3:0]). The synchronization control information may also be used to add wait states until the data has been written into and stored by I/O device 106. During these wait states, I/O device 106 may drive short wait state synchronization control information or long wait state synchronization control information on LAD [3:0] as indicated in Table 4. When I/O device 106 has written the data into the addressed memory location, I/O device 106 may drive a ready state on LAD[3:0] (e.g., 0000).

As with an I/O read LPC transaction, I/O device 106 may also send an inband error message over LAD[3:0] (e.g., 1010) to host 102 using the synchronization field of control information. The error message may indicate, for example, that the write transaction did not occur correctly or that some other error has occurred.

Host 102 may then transition to turn around (TAR) state 318 in which control of LAD[3:0] may be returned to host 102 during n clock cycle(s) T7.

In the foregoing specification, the invention has been described with reference to specific exemplary embodiments thereof. It will, however, be evident that various modifications and changes may be made thereof without departing from the broader spirit and scope of the invention as set forth in the appended claims. The specification and drawings are, accordingly, to be regarded in an illustrative rather than a restrictive sense.

What is claimed is:

1. A system comprising:
a host;
a bus coupled to the host and having a plurality of general purpose signal lines to carry time-multiplexed address, data, and control information, wherein the control information is encoded control information sent by the host over at least two of the plurality of general purpose signal lines of the bus;
a peripheral controller device coupled to the bus, wherein the peripheral controller device communicates with the host over the bus and decodes the encoded control information.

2. A system comprising:
a bus having a plurality of general purpose signal lines to carry time-multiplexed address, data, and control information, wherein the control information is encoded control information sent by the host over at least two of the plurality of general purpose signal lines of the bus;
a peripheral controller device coupled to the bus; and
a host coupled to the bus and writing first encoded control information over the bus to the peripheral controller device for decoding by the peripheral controller device, wherein the first encoded control information indicates an I/O transaction between the host and the peripheral controller device.

3. The system of claim 2, wherein the bus further comprises an independent control signal line for carrying a control signal that indicates a beginning of the I/O transaction.

4. The system of claim 3, wherein the control signal on the independent control signal line indicates aborting the I/O transaction.

5. The system of claim 2, wherein the bus includes an independent clock signal line for carrying a clock signal, and wherein the peripheral controller device synchronously communicates with the host with respect to the clock signal.

6. The system of claim 2, wherein the host writes second encoded control information to the peripheral controller device via the bus for decoding by the peripheral controller device to indicate an I/O address in the peripheral controller device.

7. The system of claim 6, wherein the host writes data to the peripheral controller device via the bus.

8. The system of claim 7, wherein the host writes third encoded control information to the peripheral controller device via the bus for decoding by the peripheral controller device to turn control of the bus over to the peripheral controller device.

9. The system of claim 8, wherein the peripheral controller device writes fourth encoded control information to the host via the bus for decoding by the host to synchronize operation of the peripheral controller device with the host.

10. The system of claim 9, wherein the fourth encoded control information comprises a wait-state.

11. The system of claim 9, wherein the fourth encoded control information comprises an indication of an error in the I/O transaction.

12. The system of claim 6, wherein the host writes third encoded control information to the peripheral controller device via the bus for decoding by the peripheral controller device to turn control of the bus over to the peripheral controller device, and wherein the host reads data at the I/O address of the peripheral controller device.

13. The system of claim 2, wherein the host comprises a processor.

14. The system of claim 2, wherein the host comprises a chip set.

15. The system of claim 2, wherein the plurality of general purpose signal lines comprises four general purpose signal lines.

16. A method of performing an input/output (I/O) transaction between a host and a peripheral controller device across a bus comprising a plurality of general purpose signal lines and a separate control line, the method comprising:

asserting a control signal on the control line to indicate the start of the I/O transaction;

writing first control information from the host to the peripheral controller device on the plurality of general purpose signal lines to indicate that the I/O transaction comprises the host writing a unit of data to the peripheral controller device;

writing second control information from the host to the peripheral controller device on the plurality of general purpose signal lines to indicate an I/O address in the peripheral controller device to which the unit of data will be written; and writing the unit of data to the peripheral controller device from the host via the general purpose signal lines.

17. The method of claim 16, further comprising:

turning control of the bus over to the peripheral controller device;

writing third control information from the peripheral controller device to the host on the plurality of general purpose signal lines to indicate a length of time before the peripheral controller device will turn control of the bus over to the host; and turning control of the bus over to the host.

18. The method of claim 17, further comprising writing third control information from the peripheral controller device to the host on the plurality of general purpose signal lines to indicate an error in the I/O transaction.

19. A method of performing an I/O transaction between a host and a peripheral controller device across a bus comprising a plurality of general purpose signal lines and a separate control line, the method comprising:

asserting a control signal on the control line to indicate the start of the I/O transaction;

writing first control information from the host to the peripheral controller device on the plurality of general purpose signal lines to indicate that the I/O transaction comprises the host reading a unit of data from the peripheral controller device;

writing second control information from the host to the peripheral controller device on the plurality of general purpose signal lines to indicate an I/O address in the peripheral controller device from which the unit of data will be read;

turning control of the bus over to the peripheral controller device;

writing third control information from the peripheral controller device to the host on the plurality of general purpose signal lines until the unit of data is ready to be read from the peripheral controller device; and reading the unit of data from the peripheral controller device via the general purpose signal lines.

20. The method of claim 19, wherein the third control information comprises an indication of an error in the I/O transaction.

\* \* \* \* \*